United States Patent

[11] 3,587,701

[72] Inventors Harold Gold
3645 Tolland Road, Shaker Heights, Ohio
44122;
Fred Macks, 1231 Normandy Terrace SW,
Seattle, Wash. 98166
[21] Appl. No. 839,916
[22] Filed July 8, 1969
[45] Patented June 28, 1971
Continuation-in-part of application Ser. No.
679;385, Oct. 31, 1967, now abandoned.

[54] THREAD LOCKING MEANS
11 Claims, 4 Drawing Figs.
[52] U.S. Cl. .................................................. 151/21
[51] Int. Cl. ...................................................... F16b 39/284
[50] Field of Search ............................................ 151/21 (A),
21 (B), 19, 22

[56] References Cited
UNITED STATES PATENTS
2,349,513  5/1944  Mortus .......................... 151/21A
2,563,162  8/1951  Eckenbeck et al. ........... 151/21B
2,816,591  12/1957 Reiner ........................... 151/21B
FOREIGN PATENTS
154,836  12/1920  Great Britain ................. 151/19
516,450  1/1940   Great Britain ................. 151/21B
546,320  7/1942   Great Britain ................. 151/21B
428,086  12/1947  Italy ............................... 151/21B Primary Examiner—Marion Parsons, Jr.
Attorney—Watts, Hoffmann, Fisher & Heinke ABSTRACT: A self-locking fastener makes use of the locking forces that are generated when a rigid, cylindrical threaded member is threaded into an elastically expandable, cylindrical threaded bore having a smaller pitch diameter than that of the cylindrical member. A threaded conical section leads into the cylindrical locking bore to provide for guiding the cylindrical member into the locking threads.

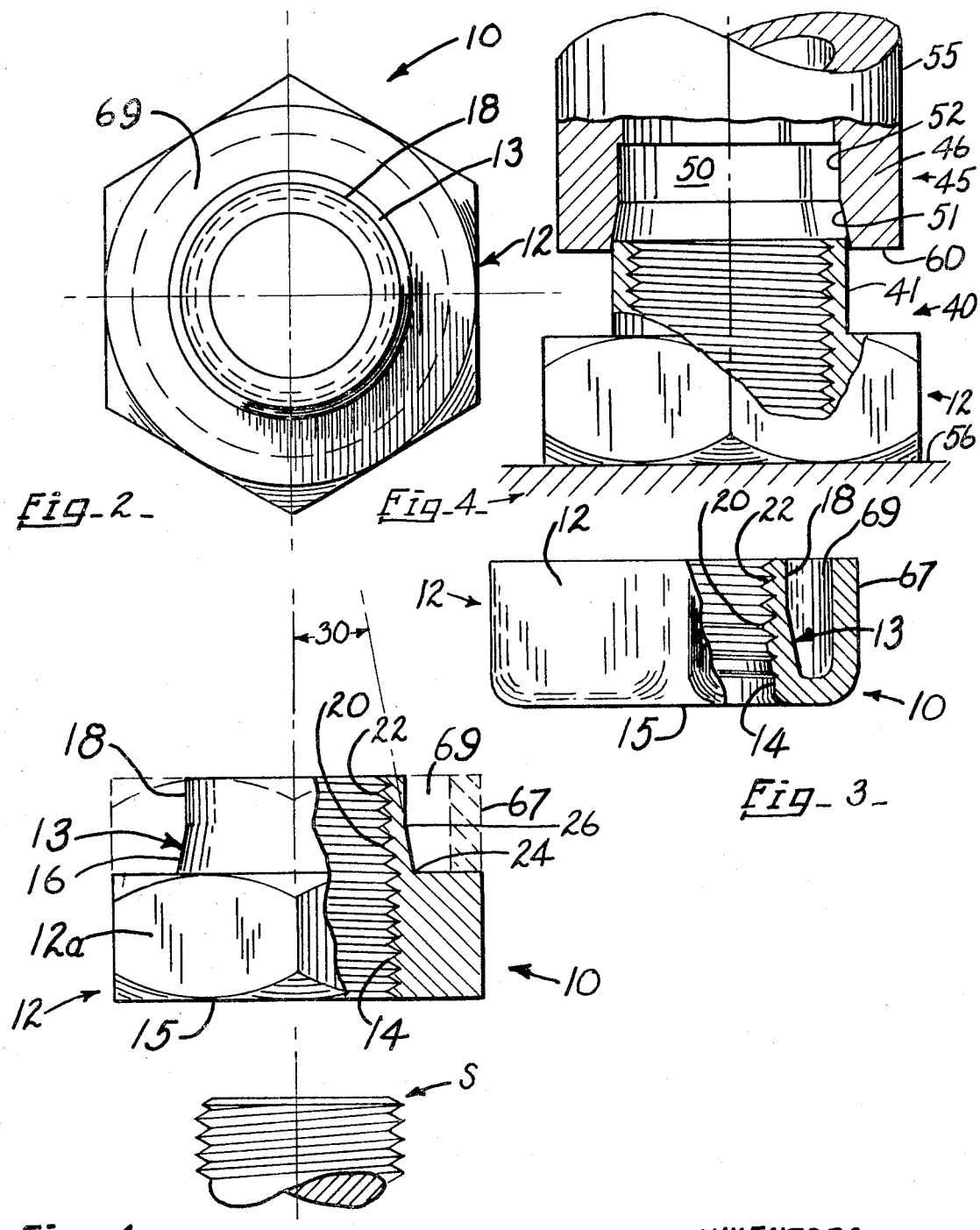

THREAD LOCKING MEANS

This is a continuation-in-part of copending application Ser. No. 679,385, filed Oct. 31, 1967, entitled THREAD LOCKING MEANS, now abandoned.

BACKGROUND OF THE INVENTION

1. Field of the Invention

The present invention relates to threaded fasteners and more particularly to threaded self-locking fasteners and their production.

2. The Prior Art

The prior art has proposed self-locking threaded fasteners employing threaded sections having diameters which tightly engage the threads of mating screws. Generally, these fasteners have employed: (1) conically threaded bores into which cylindrical threaded members are advanced; or (2) fasteners having first and second threaded cylindrical bores in which the diameter of the threads abruptly changes from a diameter permitting free threading of the cylindrical member to a smaller diameter tightly engaging the cylindrical member.

Some of these approaches to the construction of self-locking fasteners have been fairly effective when applied to fasteners having "aircraft quality" type threads, i.e., small tolerance precision threads; however, when applied to standard or commercial tolerance threads which have wide tolerance ranges these proposals have not been satisfactory.

Prevailing torque lock nuts that employ conically converging threaded crown bores have been well known for many years. When a mating screw is threaded into a conical, threaded bore formed in accordance with prior art proposals a portion of the screw bore is expanded into cylindrical form by the screw. This expanded portion provides the locking engagement with the screw, the locking torque being proportional to the length of the cylindrical engagement. For a given cone angle of the bore, the maximum obtainable length of cylindrical locking engagement is limited by rupture of the wall surrounding the bore. Simply increasing wall thickness is not a solution to this limitation because as the wall thickness is increased, the resistance to the necessary outward deformation of the conical portion increases and therefore the "ON" torque increases. Accordingly, there is a limitation to the holding power which can be achieved with any given lock nut of this type.

Moreover, successful use of this principal inherently requires a relatively high tensile material. Thus, with lower tensile strength materials such as aluminum and brass, effective locking has been achieved in the past only with such more conventional and better known techniques such as lock washers or plastic inserts.

Other prior art proposals have attempted to employ abrupt cylindrical contraction of the crown bore. When applied to "aircraft quality" fasteners these proposals had limited operability, but when applied to commercial tolerance fasteners these proposals created severe V-angle distortions of the threads in the vicinity of the abrupt diametrical reduction. This distortion made these prior art proposals unusable in the presence of the magnitude of pitch diameter reduction required for assuring thread locking action with the thread clearances that occur in commercial tolerance threaded members.

SUMMARY OF THE INVENTION

According to this invention, a self-locking nut is provided which includes a thin-walled, tubular element, or locking collar that is integral with the body of the nut. The tubular element provides an expandable, undersized, cylindrical threaded bore section and a mating threaded conical bore section. The threads in the conical section lead smoothly from free turning threads in the nut body to the undersized cylindrical bore section.

These bore sections are coaxial and are made integral with free turning threads in the nut in the process of manufacture. The stress that is induced by the mating screw in any part of the undersized cylindrical section is of no great magnitude than the stress at the outermost end of the conical section. Although the maximum stress in the conical and cylindrical sections of the locking collar are the same, the locking force between the nut and the screw is controllable. That is to say, the frictional force between the nut thread and the screw thread is a function of the length of the undersized cylindrical section of the collar and can be increased by lengthening the collar and decreased by reducing the collar length. This is accomplished without changing the hoop stress in the collar. The undersized cylindrical section thus provides the essential means of obtaining any desired length of cylindrical locking engagement.

This feature of the invention enables the use of low tensile strength materials, such as aluminum and brass in the nut, as well as the higher strength materials normally used.

The conical section provides a transition zone between the free-turning threads of the nut body and the reduced pitch diameter threads of the cylindrical locking system. The conical section may be made much shorter in axial length than the cylindrical locking section; however, the axial length of the conical section is sufficiently long to eliminate V-angle distortion in the transition zone.

In one embodiment, the thin-walled locking collar extends in its entirety away from the wrench flats of the nut. In a second embodiment, the locking collar is in an annular recess to provide additional wrench-flat surface. In the third embodiment of this invention, the locking collar is integral with the base of a sheet metal nut.

In each embodiment, the conical and undersized threaded bore sections are formed in the thin-walled locking collar of the nut.

The nut is initially formed with a bore through the nut body and collar. The bore is then tapped to produce a cylindrically threaded bore. After tapping, the locking collar is deformed to provide the conical and undersized sections. This deformation is preferably caused by upsetting the collar with a female die having conical and cylindrical cavity sections which form a conical section and a reduced cylindrical section, respectively, on the collar. This upsetting operation reduces the pitch diameter of the internal threads in the collar to form the conical and reduced diameter internal thread sections. The collar can be formed, as described, by other methods, such as rolling.

Because of this collar formation, extremely effective locking occurs even in the worst tolerance conditions expectable using commercial tolerance threads. This locking action occurs since working the thin-walled collar enables the undersized cylindrical threaded section to have a diametrical size reduction up to the sum of: (1) the maximum pitch diameter clearance; (2) the maximum diametrical tolerance of the locking collar; and (3) an amount corresponding to a minimum desired interference between the locking threads and the mating screw.

This reduction of diameter from the free turning threads of the nut to the undersized threads can amount to at least about 50 percent of the threaded tooth height. The conically threaded portion of the collar insures against any substantial V-angle distortion of the threads in the collar due to this reduction in pitch diameter.

The expansion of the locking collar by the mating screw is resilient even at the extremes of the possible tolerance ranges. For example, when the largest within tolerance locking collar having the smallest within tolerance pitch is threads is formed, and the mating screw inserted into this collar has the largest within tolerance pitch diameter, the locking collar expands to the yield stress of the collar material. Hence, the collar continues to resiliently grip the screw without rupturing. Subsequent removal and replacement of the nut on the screw therefore results in resilient gripping of the screw by the collar.

On the other hand, when the smallest within tolerance collar having the largest within tolerance internal threads is formed and applied to a mating screw having the smallest within tolerance pitch diameter, the material of the collar i—s expanded to about its elastic limit. Thus in this condition, the collar resiliently grips the screw and this gripping is repeatable with subsequent removals and replacements of the nut on the screw.

The minimum expansion collar by the mating screw can thus be seen to be controlled by the minimum interference required. This interference is preferably selected so that the last-mentioned extreme tolerance condition results in the collar being expanded to about its elastic limit.

A principal object of the present invention is the provision of a new and improved self-locking fastener effective to tightly engage a mating screw and which is effective to provide such engagement between a fastener and a screw having commercial tolerance threads.

Another object of the invention is the provision of a method of making a fastener of the character referred to in the next preceeding paragraph.

Another object of this invention is to provide a cylindrical thread locking means in which the length of the cylindrical locking thread engagement is variable by design over wide limits.

Still another object is to provide a fastener of the character referred to wherein the transition zone from free-turning threads to cylindrical-locking threads of the fastener is made effectively free from thread V-angle distortion.

Yet another object of the invention is the provision of a locking nut of the character referred to which is constructed from sheet metal material.

Other objects and advantages of the invention will become apparent from the following detailed description made with reference to the accompanying drawings which form a part of the specifications.

BRIEF DESCRIPTION OF THE DRAWINGS

FIG. 1 is a side elevational view, partially in section, of a self-locking fastener embodying the invention;

FIG. 2 is a plan view of the nut shown in FIG. 1;

FIG. 3 is a side elevational view, partially in section, of a sheet metal nut, in accordance with this invention; and FIG. 4 is a cross-sectional view of a nut and forming die in one stage of manufacture of the nut.

DESCRIPTION OF THE PREFERRED EMBODIMENTS

A self-locking nut 10 embodying the invention is shown in FIGS. 1 and 2. The nut 10 includes a nut body 12 and a locking collar, or crown 13 defined by a tubular sleeve projecting from an end of the nut body. The nut 10 is constructed to tightly engage or lock to a mating screw S (FIG. 1).

The nut body 12 has a polygonal periphery defining a series of wrench flats 12a. A threaded cylindrical bore 14 extends centrally through the nut body and is coaxial with the tubular locking collar 13. The threads of the bore 14 are of constant pitch diameter and are sized to permit the nut 10 to turn freely on the mating screw S. The bore 14 opens in an end face 15 of the nut body and extends through the body to the junction of the locking collar 13 and the nut body.

The locking collar 13 includes a frustoconical tubular section 16 converging in a direction away from the body, and a cylindrical section 18 which smoothly emerges with the frustoconical section 16. The locking collar 13 is internally threaded and includes a length of conical threads 20 within the frustoconical section 16 and cylindrical threads 22 within the cylindrical section 18.

The base 24 of the frustoconical section 16 is continuous with the nut body and the internal threads 20 at the base of the frustoconical section have the same pitch diameter as the threads in the bore 14. The threads in the converging or apex end 16 of the frustoconical section have the same pitch diameter as the threads 22 in the cylindrical section 18.

As is best shown in FIG. 1, the wall thickness of the locking collar, as measured from the root of the threads to the external periphery of the locking collar, is constant from the base 24 of the frustoconical section to the projecting end of the cylindrical section 18. The threads 16 are of smaller pitch diameter than the threads in the bore 14 as well as the threads on the screw S. The threads 20 in the conical section 16 thus provide a smooth transition between the pitch diameter of the threads in the bore 14 and the pitch diameter of the threads 22 in the cylindrical section.

Referring again to FIG. 1, the half cone angle 30 of the section 16 is relatively small. As noted, the wall thickness of the conical section 16 is constant throughout its length and accordingly the cone angle of the conical threads 20 is the same as the cone angle 30. Because of this small cone angle, there is no significant V-angle deformation of the threads in the nut 10 at the junctures of conical threads 20 with the bore 14 and the cylindrical threads 22; that is, any V-angle deformation which occurs at these junctures is not sufficient to cause thread interference. It has been found that in order to avoid "significant" V-angle deformation of the threads at the ends of the conical section, it is necessary that the half cone angle 30 be a maximum of about 20°.

When the screw S is threaded into the nut 10, the screw freely turns as it advances through the bore 14. The screw S continues to proceed through the conical transition section 20 until the pitch diameter at a particular location in the conical section is the same as the pitch diameter of the threads on the screw S. Thereafter, continued advancement of the screw S into the nut results in resilient, radially outward deflection of the frustoconical section 16. The resilient deflection of the frustoconical section results in hoop stress being developed in the locking collar which cause the threads in the frustoconical section to tightly hug the threads of the screw and assume a cylindrical form.

The maximum resilient deflection occurs at the apex end 26 of the conical section and the hoop stress in the apex end of the conical section 16 are substantially equal to the maximum hoop stress developed in the locking collar. As the screw S continues to be threaded onto the nut 10, the threads of the screw progress through the cylindrical section 18, resiliently expanding that section to produce hoop stresses equal to the hoop stress at the apex end 26 of the conical section.

While the hoop stress does not increase in magnitude as the screw S continues to be threaded entirely through the nut, it should be appreciated that the hugging or frictional force developed between the threads of the screw S and the threads in the locking collar increases in proportion to the length of the cylindrical section 18. Hence, the "ON" and "OFF" torque of the nut 10 can be controlled by the axial length of the cylindrical undersized threads 22 while the stress in the locking collar 13 remains of constant magnitude.

Formation of the nut 10 can be accomplished by turning hexagonal rod stock to produce a hexagonal nut body forming portion with a cylindrical projection 41 from the locking collar 13 is formed, as is described presently. The projection 41 is coaxial with the nut body portion. The body portion and projection are then drilled through and tapped to produce a blank nut 40 (FIG. 4).

The blank nut 40 includes a formed nut body 12 and projection 41. The tapped opening through the nut body and projection 41 is cylindrical and may be a commercial tolerance thread having a constant pitch diameter from end to end. The projection 41 is of uniform wall thickness throughout its length.

The final step in forming a nut 10 involves forming the locking collar 13 by deforming the projection 41 to provide the conical and undersized cylindrical threaded sections. In a preferred method, a cylindrical female die 45 (FIG. 4) is used to plastically deform the unformed locking collar.

The die 45 includes a body 46 having a die cavity 50. The cavity 50 is defined by frustoconical wall 51 and a straight cylindrical wall 52 coaxial with the conical wall.

It should be appreciated that the outer diameter of the projection 41 will vary according to the economically achievable tolerance of the forming process. Similarly, the pitch diameters of the internal threads in the projection 41 will vary within the standard tolerance range for these threads. Accordingly, the diameter of the cylindrical die wall 52 is equal to the minimum within tolerance diameter of the unformed collar, less the tolerance range of the threads in the collar, and less an amount required as a minimum desired interference between the threads in the collar and the threads on the mating screw. This interference is preferably about 0.005 inches per inch of nominal thread diameter.

The conical wall 51 has a base diameter equal to the largest within tolerance O.D. of the projection 41 and merges in the cylindrical wall 52 at its apex end. The cone angle of the wall 51 is equal to the desired cone angle of the conical wall 16 of the locking collar 13 and hence is a maximum of about 20°.

As shown in FIG. 4, the die 45 is carried on a suitable arbor 55 (only a part of which is shown) and the nut blank 40 is placed on an anvil 56. A circular stop surface 60 on the die bottoms against the nut body 12 to limit movement of the die toward the nut. The nut is ejected from the die by pressing a suitable tool against the projecting end of the locking collar and pushing the nut out of the cavity. An access opening for such a tool is shown in FIG. 4.

It is apparent from FIG. 4 and the preceeding description that when the projection 41 has a minimum within tolerance diameter, the die 45 will reduce the diameter of the collar by an amount equal to the thread tolerance range and the desired interference. In such circumstances, the diametral reduction of the threads in the collar is less than if the outside diameter of the collar were larger. Accordingly, a shorter conical section can be utilized. Since the stop surface 60 bottoms against the nut body itself, it should be appreciated that the conical section formed is of minimum length due to the small initial diameter of the collar.

On the other hand, if the initial within tolerance collar diameter is at its maximum, the length of the conical section would be maximum thus providing a longer transition zone to accommodate the larger radially inward compression of the threads in the collar.

While use of a female die 45 to upset the projection 41 is disclosed, the same result can be obtained by the use of a suitable forming roll or rolls on the screw machine used to form the nut blank.

Due to tolerance variations, inherent in formation of the nut 10 and the screw S there are two extreme tolerance conditions which must be accounted for in the projection of the nut 10. The first extreme condition exists when the unformed collar has a maximum within tolerance diameter; the threads in the collar have a minimum within tolerance pitch diameter; and the mating screw threads are of maximum within tolerance pitch diameter. In this tolerance condition, the forming process reduces the pitch diameter of the threads in the collar by the total amount of the collar O.D. tolerance; the total amount of the thread pitch diameter tolerance; and by the amount required for minimum interference.

When the maximum within tolerance diameter screw is advanced through this nut, deflection of the locking collar is maximum and hence the hoop stress at the apex end 26 of the conical section and the cylindrical section 18 is maximum. The thickness of the collar 13 is selected so that in this last-mentioned condition, the expansion of the collar by the screw results in the hoop stresses which reach the yield stress of the nut material. Hence, the expansion of the collar by the screw results in the collar resiliently hugging the screw.

When this nut is repeatedly removed from, and replaced on, the screw, the collar is resiliently expanded by the screw during each replacement to generate requisite locking forces for producing acceptable "ON" and "OFF" torques.

The second extreme tolerance condition exists where the unformed collar 41 has a minimum within tolerance O.D.; the threads in the collar have a maximum within tolerance pitch diameter; and the screw S has minimum within tolerance threads.

In this second condition, the locking collar will be expanded by the screw only to the extent of the minimum desired interference between the screw thread pitch diameter and the pitch diameter of the undersized threads in the collar. The amount of this interference is selected so that in the second-mentioned tolerance condition, the screw expands the locking collar sufficiently to produce maximum hoop stresses at or approaching the elastic limit of the material of the locking collar. This assures resilient gripping of the screw by the collar and provides for acceptable "ON" and "OFF" torques of the nut after repeated removals and replacements on the screw.

The following table illustrates the magnitude of the pitch diameter reduction of class 2B locking collar threads of various sizes. These collars all have the maximum within tolerance O.D.

| Size | C* | E | T | ΔD | $h_t$ | $\frac{\Delta D}{h_t}=100$, percent |
|---|---|---|---|---|---|---|
| 10-24 | .0096 | .0010 | .006 | .0166 | .027 | 62 |
| ¼-20 | .0107 | .0013 | .006 | .0180 | .032 | 56 |
| 5⁄16-18 | .0118 | .0016 | .006 | .0194 | .036 | 54 |
| ⅜-16 | .0127 | .0019 | .008 | .0226 | .041 | 55 |
| 7⁄16-14 | .0136 | .0022 | .008 | .0238 | .047 | 51 |
| ½-13 | .0145 | .0025 | .010 | .0270 | .050 | 54 |
| 9⁄16-12 | .0152 | .0028 | .010 | .0280 | .054 | 52 |
| ⅝-11 | .0160 | .0032 | .011 | .0302 | .059 | 51 |
| ¾-10 | .0172 | .0038 | .012 | .0330 | .065 | 51 |

*Based on Table 17, pg. 381, 1968 SAE Handbook.
where:
ΔD = Collar diametral reduction, inches.
C = Maximum pitch diameter clearance, Class 2B, inches.
E = Minimum interference required, .005 in. per in. major diameter.
T = Locking collar diameter tolerance (prior to compression).
$h_t$ = Internal thread tooth height, inches.

As illustrated in the table, the required increment of reduction in the diameter of the wall 18 is the sum of maximum pitch diameter clearance; the minimum interference required; and the economically achievable tolerance on the diameter of wall 18, as it exists prior to compression by the conical-cylindrical die 45. The sum of these factors requires a diametrical contraction that approaches at least 50 percent of the thread tooth height. Because of the magnitude of contraction likely to be encountered it has been found that the cone angle of the wall 16 must be substantially 20° or less in order to permit the threads in the bore section 22 to converge without significant thread V-angle distortion. More abrupt cone angles cause severe V-angle distortion in this transition zone. Where axial space permits, the cone angle can be made less than 20° to provide greater mechanical advantages to the penetrating screw for expanding the collar 13, i.e. to reduce the "ON" torque.

Because the length of cylindrical locking engagement between the collar and the screw primarily determines the locking torque for a given maximum hoop stress in a given collar, the length of the cylindrical threads can be selected to obtain extremely secure clamping with hoop stresses that are less than the elastic limit stress of mild steel, brass, aluminum and the like. Therefore, lock nuts made in accordance with this invention are producible in any fastener material and are capable of maintaining acceptable locking torque over many reuses.

Referring again to FIGS. 1 and 2, the nut body 12 can be formed with a wall 67 surrounding the collar 13. The wall 67 provides additional wrench flat areas on the body. An annular groove 69, surrounds the collar. This groove is sufficiently wide to permit access of the die 45 and also permits the locking collar to expand under the threaded penetration of a mating screw.

Referring to FIG. 3, a lock nut 70 utilizing the thread locking means of this invention is shown fabricated from sheet metal. The sheet metal nut 70 is substantially the same as the nut 10, except as noted, and similar parts have corresponding reference characters.

In the process of manufacturing the nut 70, the locking collar is initially a cylindrical tube forming a coaxial hole for the threaded sections 20, 22. The locking collar is formed by a threaded mandrel having the male equivalent of the sections 20, 22. The mandrel is inserted in the cylindrical collar forming tube and the tube is contracted onto the mandrel by a die or wheel which simultaneously forms the conical and cylindrical walls 16, 18 and the threaded sections 20, 22. The die or wheel is then retracted and the mandrel is unscrewed from the collar. The nut body 12 is formed by a radially outwardly extending portion forming the face 15. The wrench flats 12a are formed by a skirtlike portion coextending with the collar. The nut body 12 can be formed at any suitable stage in the manufacturing process.

The diameter of the opening in the nut body 12 of the nut 70 is made equal to or larger than the major diameter of the largest threads in the section 20 so that the threaded mandrel, and later the mating screw may enter. Also, as illustrated in FIG. 3 the threads in the nut body 12 are not full V's because of the small diametrical contraction that occurs at the base of the conical wall 16. It has been found that sufficient thread strength is obtained through the full threads in the bore sections 20, 22.

Those skilled in the art will appreciate that the nut illustrated in FIG. 3 can be fabricated by the straight tap method described in reference to FIGS. 1 and 2. By using such a tap, full threads are formed in the nut body as is shown in FIG. 1.

Although two preferred locking fasteners have been illustrated and described in considerable detail, the present invention is not limited to the precise constructions shown, for example, the invention can be applied to flange-type nut bodies, nuts adapted for welding to structures, clinch nuts and wing nuts. Other adaptions, modifications and uses of the invention may occur to those skilled in this art and it is the intention to cover all such adaptations, modifications and uses.

I claim:
1. A thread locking means comprising:
   a. a tubular member having a threaded opening;
   b. said opening having a portion of cylindrical, substantially constant pitch diameter and an adjoining axially aligned portion of expanding pitch diameter;
   c. said expanding pitch diameter portion providing to a mating threaded member access to said constant pitch diameter portion;
   d. said constant pitch diameter portion adapted to provide an interference fit with said mating member;
   e. said tubular member being diametrally expandable under the threaded penetration of such mating member;
   f. the diameter of said constant pitch diameter portion being less than the diameter of the larger end of said expending pitch diameter portion; and
   g. the wall of said tubular member surrounding said constant pitch diameter portion and said expanding pitch diameter portion being circumferentially continuous and of substantially constant thickness.

2. The locking means of claim 1 wherein said opening defines a third portion of substantially constant pitch diameter axially aligned with the other portions, said third portion having a diameter larger than the diameter of the first-mentioned constant pitch portion and larger than the smallest diameter of said expanding pitch portion, said expanding pitch portion extending between and connecting said third-mentioned and said constant pitch diameter portions.

3. The locking means claimed in claim 1 wherein lines through crests of threads in said expanding pitch diameter portion intersect an axis of said substantially constant pitch diameter portion at an included angle of about 20° or less.

4. The locking means claimed in claim 1 wherein the distance between adjacent crests of threads in said expanding pitch diameter portion and in said constant pitch diameter portion is substantially constant throughout the length of said expanding pitch diameter portion and said constant pitch diameter portion.

5. The locking means claimed in claim 1 wherein the material of said tubular member has an elasticity such that the threads of said cylindrical portion can be expanded by insertion of said mating threaded member to a diameter substantially equal to the largest diameter of said tapering threaded section.

6. A lock fastener comprising:
   a. a body having a through, threaded opening extending from a first to a second end;
   b. said fastener including a cylindrical circumferentially continuous locking portion extending from the first end toward the second end with the threads thereof having —crests substantially defining a cylindrical surface of revolution;
   c. said opening including a guide portion extending from the locking portion toward the second end and flaring outwardly from said locking portion such that the diameter of the threads in the guide portion increases in the direction from the first to the second end of the opening; and
   d. the body material defining the locking portion and the guide portion having a substantially constant wall thickness, said locking portion elastically expanded by insertion of a mating threaded member to a diameter substantially equal to the largest diameter of the guide portion without rupture of said wall.

7. The fastener of claim 6 wherein there is a lead portion substantially defining another surface of revolution of a diameter larger than the first-mentioned surface of revolution and wherein said guide portion is between and connecting said portions defining said surfaces of revolution.

8. A lock nut comprising:
   a. a nut body;
   b. a tubular locking collar to said nut body;
   c. an axial threaded opening extending through said nut body and said locking collar;
   d. said locking collar having a tapering section adjacent said nut body and a substantially cylindrical section contiguous with said tapering section at the apex end;
   e. said axial threaded opening including a tapering threaded section in said tapering section of said collar and a cylindrical threaded section in said cylindrical section of said collar, said locking collar being thereby substantially constant wall thickness throughout its length;
   f. said tapering section being of substantial length, whereby the distance between crests of adjacent thread teeth is substantially constant throughout said tapering and cylindrical threaded sections;
   g. the axial length of said cylindrical section being equal to or greater than the axial length of said tapering section; and
   h. said nut body being radially larger than said collar and a radial shoulder being thereby formed at the junction of said nut body and said collar.

9. The fastener claimed in claim 8 wherein at least the apex end of said tapering section is frustoconical and defines a half cone angle not exceeding about 20°.

10. The fastener claimed in claim 8 wherein the pitch diameter of threads at a base end of said tapering section is at least as large as the pitch diameter of a mating threaded member and the pitch diameter of said cylindrical section is smaller than the pitch diameter of said mating member.

11. The fastener claimed in claim 10 wherein the apex end of said tapering section and said cylindrical section are diametrally expanded by a mating threaded member to substantially provide uniform hoop stresses from said apex end through said cylindrical section.